INVENTOR.
RAINER KURZ

3,546,457
RADIATION MONITORING SYSTEM UTILIZING PSEUDO-COINCIDENCE TECHNIQUES
Rainer Kurz, Oak Ridge, Tenn., assignor to Laboratorium Dr. Berthold, Wildbad, Germany, a company of Germany
Filed June 6, 1967, Ser. No. 644,013
Claims priority, application Germany, June 8, 1966, L 53,799
Int. Cl. G01t 1/16
U.S. Cl. 250—83.3                3 Claims

ABSTRACT OF THE DISCLOSURE

A radiation monitoring system with two input channels and pseudo-coincidence circuitry comprises means for delaying the pulses which arrive first in one input channel and means for stretching the other pulses in the other input channel whereon both channels are fed to an instrument forming the pseudo-coincidence.

BACKGROUND AND SUMMARY OF THE INVENTION

The present invention relates to radiation monitoring systems, and more particularly to an air monitoring installation wherein special pseudo-coincidence circuitry makes elevated gamma-background radiation ineffective.

In nuclear radiation, for instance, in a decay chain of uranium-238 or thorium-232, the emission of different types of radiation or quanta occurs within a very short time, these intervals being determined by the half life of the substance. For instance, the $\beta$-radiation of radium-C with a half life of about 160 $\mu$s. is followed by $\alpha$-radiation of radium C'.

The occurrence rate of these "pseudo-coincidences" may be generated in electronic circuitry including logic units with standard transistorized modules, and they may be used to compensate for natural radiation activity to increase the monitoring sensitivity for artificial radiation.

In a known pseudo-coincidence installation for monitoring air, the pulses from the alpha- and beta-detectors are fed to an amplifier and a discriminator, and the pulses have the same size and form at the outputs of the discriminators. The $\beta$-radiation pulses, which arrive first, are fed to a pulse stretcher which stretches the pulses to a duration of 200 $\mu$s. The output pulses from the pulse stretcher open a gate circuit. The $\alpha$-radiation pulses, which appear simultaneously with, or after, the $\beta$-radiation pulses, can pass through the gate circuit for the duration of 200 $\mu$s. In this arrangement, the coincidence pulse rate as well as the random coincidence rate is obtained at the output of the gate circuit. Since the pulse duration of the alpha-pulses is small in relation to the 200 $\mu$s. duration of the beta-pulses, the pulse duration of the alpha-pulses may be neglected. Thus, the number of random coincidences is derived from the following equation:

$$J_z = J_\alpha . J_\beta . T$$

Since the coincidence time T is long, the monitored value of the random coincidences may show considerable errors.

H. Gebauer, Kerntechnik 7 (1965), pages 322–325, describes a system for compensating for the natural background radiation in air by means of beta-alpha-pseudo-coincidences. In experiments, random coincidences up to 15% of the pseudo-coincidence rate were found.

All of the conventional instllations of this type have the disadvantage that gamma background radiation causes considerable errors in the pseudo-coincidence pulse rate.

It is the primary object of the present invention to provide a system overcoming the above difficulties without complicating the installation so that the output from two input channels for pulses of different types of radiation very accurately gives the pseudo-coincidental pulses.

This object is accomplished in accordance with this invention by delaying the pulses which arrive first in one input channel, and stretching the other pulses in the other input channel, whereon both pulses are fed to an instrument forming a pseudo-coincidence.

In this manner, the gate circuit is not opened by the beta-pulses. However, the alpha-pulses pass through the gate circuit and open the gate to permit the beta-pulses to pass therethrough. The advantage of this is as follows:

The circuit is not activated by the beta-pulses and the $\gamma$-pulses emanating from the background radiation which are inseparable from the beta-pulses in the installation. The pulses in the beta-channel occur by orders of magnitude more often and also fluctuate greatly so that, at times, the gate of the known installations is constantly open and an effective monitoring becomes practically impossible.

Furthermore, in a preferred embodiment, random coincidence may be avoided if the undelayed pulses in one channel are brought into coincidence with the pulses in the other channel, and the difference of the two coincidence rates is formed. In other words, the two coincidence rates are determined first, and the final rate is determined by deducting one from the other.

DETAILED DESCRIPTION OF PREFERRED EMBODIMENT

Figure 1:
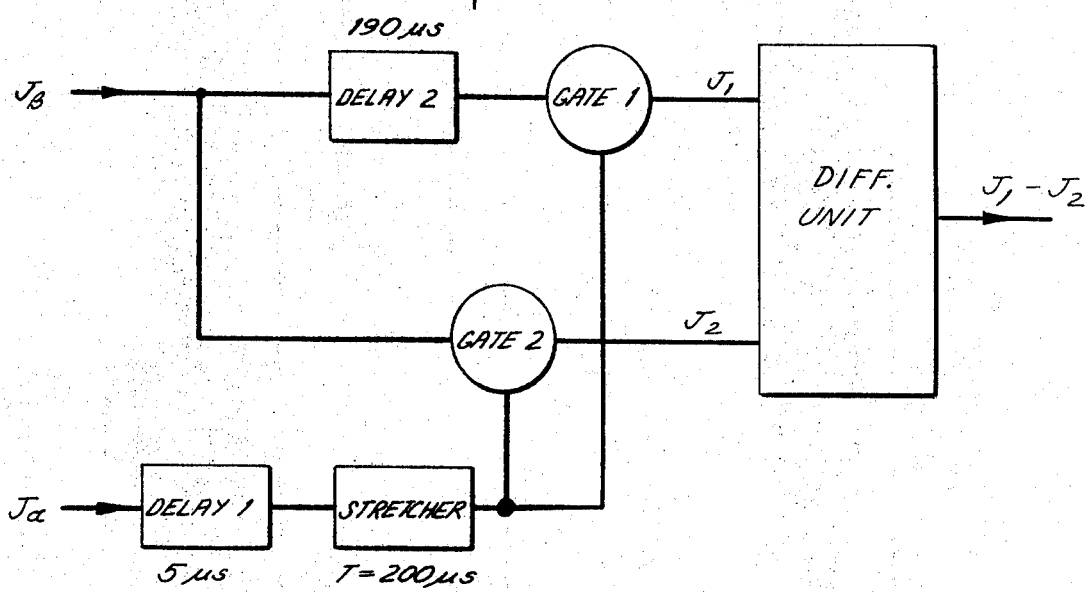
FIG. 1 is a schematic circuit diagram of an embodiment of the radiation monitoring system of the present invention.

Referring first to FIG. 1, the first incoming beta-pulses are delayed by delay 2 (about 190 $\mu$s.) and fed into gate 1. The alpha-pulses which follow are also delayed but only for a short time by delay 1 (about 5 $\mu$s.) and then stretched by a stretcher to a duration of 200 $\mu$s. and fed into gate 1. The output pulse rate of gate 1 is denoted $J_1$ and contains the pseudo-coincidence pulse rate as well as the random coincidence pulse rate.

Compensation of the random coincidence rate is realized in gate 2, fed by the beta-pulses and opened by the alpha-pulses with duration of 190 $\mu$s. The short delaying of alpha-pulses is necessary to prevent the coincidence alpha- and beta-pulses from passing through gate 2. In case of beta-alpha-pseudo-coincidence, an alpha-pulse arrives in coincidence with, or later than, a beta-pulse, and so it cannot pass through gate 2. Consequently, the output of gate 2 in principle consists of random coincidence pulses with pulse rate $J_2$.

This system operates according to the following equations, wherein $J_1$ is the pulse rate received from gate 1, $J_2$ is the pulse rate received from gate 2, T is the duration of the stretched alpha-pulse, and $J_{ps}$ is the pseudo-coincidence pulse:

$$J_2 = J_\alpha . J_\beta . T$$

$$J_1 = J_{ps} + (J_\beta - J_{ps}) . J_\alpha . T$$

$$J_1 = J_{ps} + J_\alpha . J_\beta . T - J_\alpha . J_{ps} . T$$

Deducting $J_1-J_2$ equals $$J_1-J_2=J_{\text{ps}}(1-J_a \cdot T)$$

Thus, the output of the difference unit, which is fed by the adding input and the subtracting input, produces a pseudo-coincidence pulse rate which is independent of the beta pulse rate. This means that the monitoring unit is useful even when the gamma background radiation varies.

Accordingly, the system of the present invention reduces the error in the pseudo-coincidence pulse rate by a ratio of $J_a/J_\beta$ since the beta pulse rate is always greater than the alpha pulse rate in monitoring radiation in the air. Also, since both pulse gates 1 and 2 are opened by the same pulse source, i.e. the pulse stretcher in channel $J_a$, both gates have absolutely the same properties, particularly in respect to their opening times.

Figure 2:
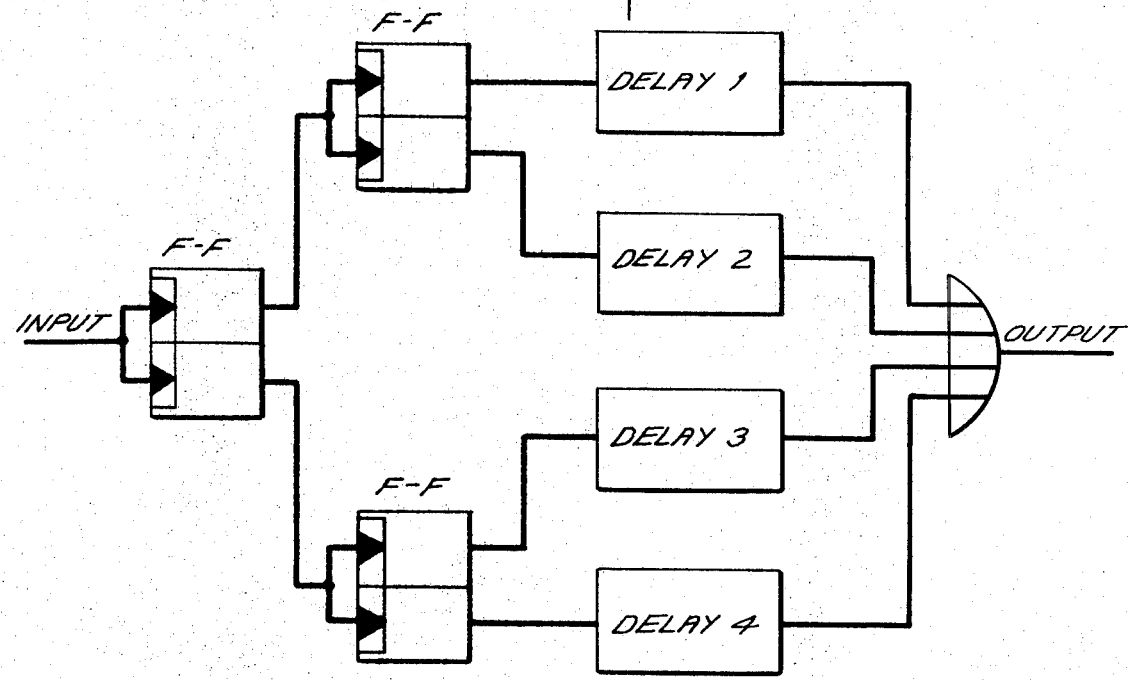
FIG. 2 is a schematic circuit diagram of the delay stage 2 of FIG. 1.

The simplest method of delaying digital pulses is to use the fly-back pulse of a monostable multivibrator but the dead time of such a stage is always longer than its delay time. A useful delay stage 1 with a delay of 5 μs. is illustrated in FIG. 2. Such a delay time of 5 μs. poses no problems. However, the delay stage 2 with a delay time of 190 μs. cannot be a simple monostable multivibrator because the dead time is much too long.

The schematic circuit diagram of FIG. 2 shows a delay stage wherein the input pulses are distributed over three fast flip-flop stages F—F to four like monostable delay units 1, 2, 3, 4. The output pulses of the four delay units are connected to an OR-circuit. Such a circuit has the same capacity as a monostable multivibrator with a dead time of about 200 μs., which is connected to a divider of the factor 4. In this manner, the dead time of delay stage 2 is reduced sufficiently to prevent malfunctioning of the entire system.

Figure 3:
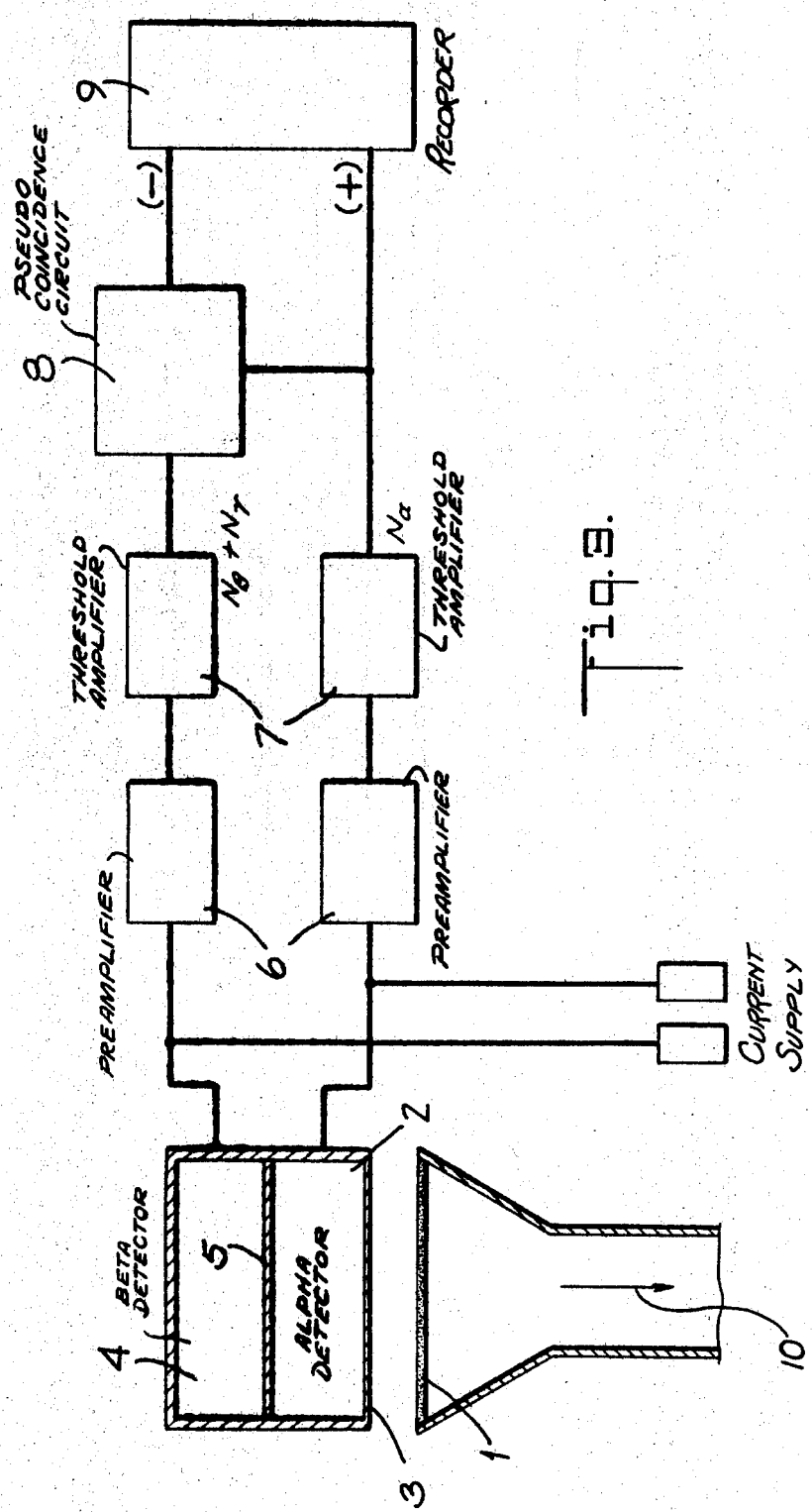
FIG. 3 schematically shows an air monitoring installation using the pseudo-coincidence system of FIG. 1.

A complete air monitoring installation using the pseudo-coincidence circuits of FIGS. 1 and 2 is shown in FIG. 3. The air to be monitored contains radioactive substances in the form of aerosols. This air is drawn through a filter 1 by a pump (see arrow 10), the aerosols being deposited on the filter. Concentrating the aerosols on the filter enhances the sensitivity of the installation by many orders of magnitude compared to a direct measurement of the air. Glass fiber filters of eight-inch diameter supported on sintered steel plate are useful for this purpose.

Mounted above the filter are two superimposed large surface flow counters with active diameters of 20 cm. to record the alpha- and beta-radiation emitted from the aerosols on the filter. The lower detector 2 is operated in the alpha-plateau and does not register beta- and gamma-radiation. The entrance window 3 of the alpha-detector is only 0.4 mg./sq. cm. thick, background is 1 c.p.m.

The second detector 4 operates in the beta-plateau. It is separated from the alpha-detector by thin foil 5 of 3 mg./sq. cm. Due to their short range, α-particles emanating from the filter cannot penetrate up to the β-radiation detector while the β-radiation is absorbed only slightly.

Each radiation detector 2 and 4 uses a transistor preamplifier 6 followed by a linear amplifier with threshold 7 for producing standard pulses. The pulses from the alpha- and beta-detector are fed together into the pseudo-coincidence circuit 8 of the present invention, which produces an output signal proportional to the natural radioactivity. This signal, provided with a proper factor, is subtracted from the total α-activity and may be recorded by recorder 9.

A count rate of 360,000 c.p.m. in the β-channel produces only a 2% false reading in this system, such a rate being equivalent to a dose rate of about 1 mR./h. This is in contrast to previously known α-aerosol monitors using pseudo-coincidence systems to compensate for natural radioactivity, which have become completely ineffective at such high radiation levels.

I claim:

1. A radiation monitoring system comprising radiation detector means for detecting first and second types of radiation and for transmitting first and second pulses onto first and second channels, respectively, in accordance with the type of radiation detected, means associated with said first channel for delaying said first pulses, means associated with said second channel for stretching said second pulses, gate means having a first input connected to said delay means and a second input connected to said stretching means for detecting pseudo-coincidence between the delayed first pulses and the stretched second pulses further comprising second gate means having a first input for receiving the first pulses undelayed and a second input for receiving the stretched second pulses for detecting pseudo-coincidences between said pulses, and means connected to said first and second gate means for forming the difference between the two pseudo-coincidence rates.

2. The radiation monitoring means of claim 1 wherein said delay means comprises a plurality of like delay devices, each having an input and an output, a plurality of flip-flop stages,
   means for interconnecting said flip-flop stages, whereby said first pulses are distributed to the inputs of said delay devices, and an OR-circuit connected to the outputs of said delay devices for combining the pulses emitted by said delay devices.

3. The radiation monitoring system of claim 1 further comprising further delay means for delaying the pulses transmitted to the second input of said gate means.

References Cited

UNITED STATES PATENTS

| | | | |
|---|---|---|---|
| 3,114,835 | 12/1963 | Packard | 250—71.5 |
| 3,291,248 | 12/1966 | Majani et al. | 307—231 |

RALPH G. NILSON, Primary Examiner

M. J. FROME, Assistant Examiner

U.S. Cl. X.R.

328—110